United States Patent
Yu et al.

(10) Patent No.: US 9,513,501 B2
(45) Date of Patent: Dec. 6, 2016

(54) TOUCH PANEL, TOUCH SCREEN STRUCTURE THEREOF, AND TOUCH DISPLAY DEVICE THEREOF

(71) Applicant: TPK TOUCH SOLUTIONS (XIAMEN) INC., Xiamen (CN)

(72) Inventors: Jing Yu, Xiamen (CN); Qiong Yuan, Xinyu (CN); Manyu Yang, Longyan (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 281 days.

(21) Appl. No.: 14/016,140

(22) Filed: Sep. 2, 2013

(65) Prior Publication Data
US 2014/0063372 A1    Mar. 6, 2014

(30) Foreign Application Priority Data
Sep. 6, 2012    (CN) .......................... 2012 1 0328727

(51) Int. Cl.
*G02F 1/1333*    (2006.01)
(52) U.S. Cl.
CPC .................................. *G02F 1/13338* (2013.01)
(58) Field of Classification Search
CPC .................................................. G02F 1/13338
USPC ......... 345/173–178; 178/18.01–18.09, 18.11
See application file for complete search history.

(56) References Cited

U.S. PATENT DOCUMENTS

| | | | | |
|---|---|---|---|---|
| 2004/0001526 | A1* | 1/2004 | Hoffer | G01K 13/00 374/141 |
| 2010/0163542 | A1* | 7/2010 | Kwon | G06F 1/1613 219/209 |
| 2011/0281104 | A1* | 11/2011 | Iftime | B41M 7/0036 428/327 |
| 2015/0028294 | A1* | 1/2015 | Kim | H01L 27/322 257/40 |

FOREIGN PATENT DOCUMENTS

| | | | |
|---|---|---|---|
| CN | 201432547 Y | | 3/2010 |
| CN | 202189343 U | * | 4/2012 |
| TW | M420766 U | | 1/2012 |

* cited by examiner

*Primary Examiner* — Amare Mengistu
*Assistant Examiner* — Jennifer Zubajlo
(74) *Attorney, Agent, or Firm* — Paul Bendemire

(57) ABSTRACT

An exemplary embodiment of the present disclosure provides a touch screen structure used in a touch panel. The touch screen structure comprises a protection cover and at least one color changeable decoration layer. The color changeable decoration layer is made of thermochromic material or photochromic material, located at a side region of the lower surface of the protection cover, and the region at which the color changeable decoration layer is located defines a non-visible region of the touch panel.

22 Claims, 3 Drawing Sheets

TOUCH PANEL, TOUCH SCREEN STRUCTURE THEREOF, AND TOUCH DISPLAY DEVICE THEREOF

All related applications are incorporated by reference. The present application is based on, and claims priority from, China Application Serial Number No. 201210327817.0, filed on Sep. 6, 2012, the disclosure of which is hereby incorporated by reference herein in its entirety.

BACKGROUND OF THE INVENTION

Field of the Invention

The present disclosure relates to a touch panel, and in particularly, to a touch panel having a color changeable decoration layer, a touch screen structure thereof, and a touch display device thereof.

Description of the Related Art

Currently, the touch panel is widely used in the electronic product, such as the cell phone and the pad. The touch panel itself can be integrated with the display unit to achieve the touch capability and display capability, thus providing an institute and convenient human machine interface to the user.

The conventional touch panel usually has a decoration layer formed at the lower surface of the protection cover associated with the touch panel, wherein the decoration layer can be a side region of the architecture to mask all of the peripheral layouts and circuits within the decoration layer of the entire touch panel architecture. The decoration layer is usually an ink layer with a single color, and thus the color of the side region of the conventional touch panel is monotone.

Furthermore, the conventional decoration layer is mainly used to mask the peripheral circuits. Since at least a pattern or graph may be directly formed on the single ink decoration layer, the efficiency for masking the peripheral circuits and the post manufacture of the other components of the touch panel are affected. Therefore, it is not easy to show the design of pattern or graph on the side region of the touch panel, and therefore the visual effect of the side region of the conventional touch panel is usually monotone.

BRIEF SUMMARY OF THE INVENTION

The decoration layer of a touch panel is modified and designed in the present disclosure, such that the decoration layer not only provides a sheltered function, but also changes its color according to a temperature or light variation.

An exemplary embodiment of the present disclosure provides a touch screen structure used in a touch panel. The touch screen structure comprises a protection cover and at least one color changeable decoration layer. The color changeable decoration layer is made of thermochromic material or photochromic material, and located at a side region of the lower surface of the protection cover, and the region at which the color changeable decoration layer is located defines a non-visible region of the touch panel.

An exemplary embodiment of the present disclosure provides a touch panel, and the touch panel comprises a protection cover, at least a color changeable decoration layer, an insulation layer, and a touch substrate. The color changeable decoration layer is made of thermochromic material or photochromic material, and located at a side region of the lower surface of the protection cover, and the region at which the color changeable decoration layer is located defines a non-visible region of the touch panel. The insulation layer is located at the lower surface of the protection cover and the color changeable decoration layer. The touch substrate is located at the lower surface of the insulation layer, such that the touch substrate and the protection cover are adhered to each other via the insulation layer. Wherein the touch substrate further includes a sensing electrode layer and the insulation layer made of the transparent optical adhesive of any kind.

An exemplary embodiment of the present disclosure provides a touch panel, and the touch panel comprises a protection cover, at least one color changeable decoration layer, and a sensing electrode layer. The color changeable decoration layer is made of thermochromic material or photochromic material, and located at a side region of the lower surface of the protection cover, and the region at which the color changeable decoration layer is located defines a non-visible region of the touch panel. The sensing electrode layer is formed under the protection cover and the color changeable decoration layer. The sensing electrode layer is directly formed under the lower surface of the protection cover and the lower surface of the color changeable decoration layer. Furthermore the smoothing layer is located at the lower surface of the protection cover, and located at a visible region corresponding to the non-visible region of the touch panel, wherein the sensing electrode layer is formed at the lower surface of the smoothing layer.

An exemplary embodiment of the present disclosure provides a touch display device comprising one of the above mentioned touch panels, a display unit, and a calculation unit, wherein the touch panel is located on the display unit, and the calculation unit is electrically connected to the display unit and the touch panel.

Furthermore, the thermochromic material is heat sensitive material.

Furthermore, the thermochromic material comprises liquid crystals packaged by microscopic capsules.

Furthermore, the photochromic material is metamerism.

Furthermore, the photochromic material comprises spiro indoline, spiro pyran, spiro oxazine, or combination thereof.

To sum up, the touch panel and the touch screen structure provided by the exemplary embodiments of the present disclosure have the color changeable decoration layer, wherein the color changeable decoration layer can change its color according to the temperature or light variation, and various and colorful visual appearances are obtained via the pattern or graph designs, such that the touch panel and the touch screen structure provide a good visual effect.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Exemplary embodiments of the present disclosure provide a touch panel having the color changeable decoration layer, a touch screen structure thereof, and a touch display device thereof. The decoration layer of the touch panel or touch screen structure is made of thermochromic material or photochromic material, and thus the decoration layer can change its color according to the temperature or light variation. Compared to decoration layer of the conventional touch panel, the color changeable decoration layer does not have the problem of monotone and dull. Additionally, the color changeable decoration layer can be designed to show a pattern or graph at the specific temperature or under the illumination of the light with the specific wavelength, such that the electronic apparatus uses the touch panel or the touch screen structure can have the anti-fake function.

By the way, the term "on" or "under" used in the present disclosure is merely used to define the relative position, and the present disclosure is not limited thereto. The upper side of the touch panel in the present disclosure means the position more neighboring to the observer, and the term lower side of the touch panel means the position farther away the observer.

Exemplary Embodiment of Touch Panel and Touch Screen Structure

Figure 1A:
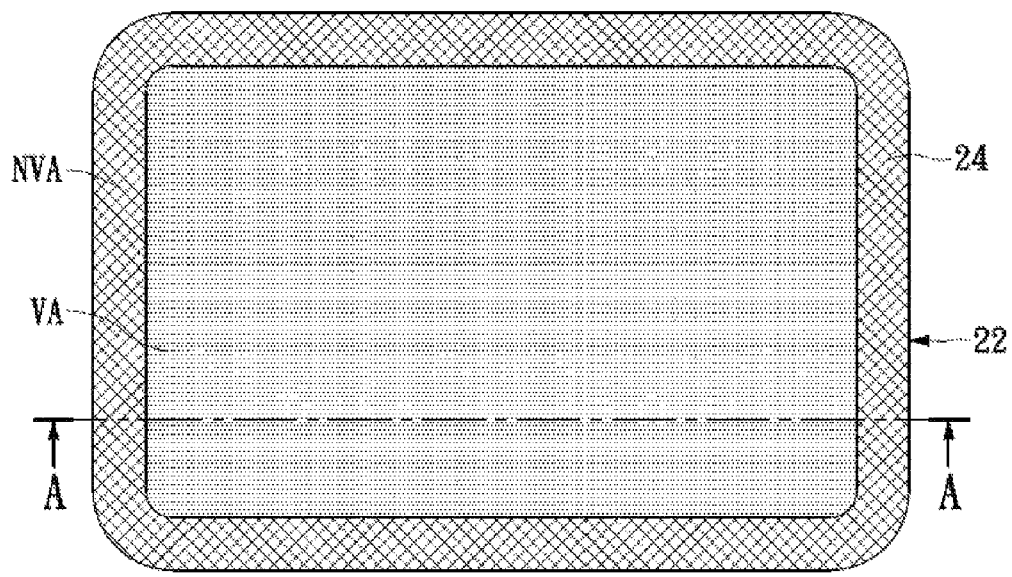
FIG. 1A is a planar view of a touch panel according to an exemplary embodiment of the present disclosure.
Figure 1B:
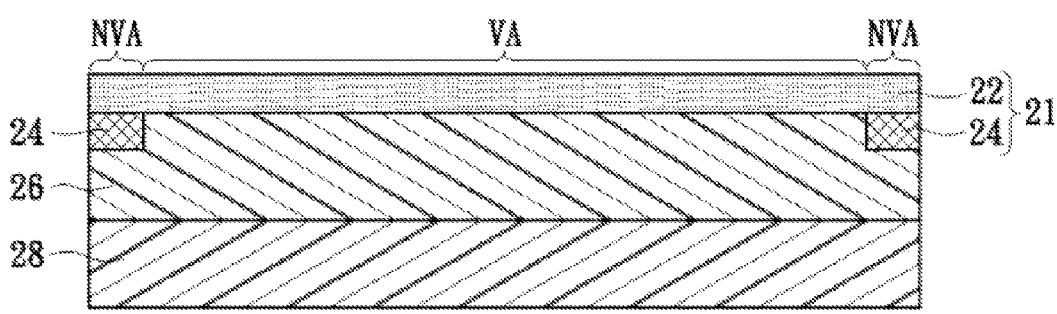
FIG. 1B is a sectional view of the touch panel of FIG. 1A along with the section line AA.

Referring to FIG. 1A and FIG. 1B, FIG. 1A is a planar view of a touch panel according to an exemplary embodiment of the present disclosure, and FIG. 1B is a sectional view of the touch panel of FIG. 1A along with the section line AA. The touch panel 2 is defined to have a visible region VA and a non-visible region NVA, and comprises a protection cover 22, a color changeable decoration layer 24, an insulation layer 26, and a touch substrate 28. Regarding the structure of the touch panel 2, the visible region VA and the non-visible region NVA are defined without overlapping. Usually, the non-visible region NVA surrounds the visible region VA, and the present disclosure is not limited thereto. In the other exemplary embodiment, the non-visible region NVA can be located at least on one side of the visible region VA.

The protection cover 22 can be made of transparent insulating material, such as glass or polyethylene. The color changeable decoration layer 24 is located at the side region of the lower surface of the protection cover 22, and the region at which color changeable decoration layer 24 is located defines the non-visible region NVA of the touch panel 2. The insulation layer 26 is located at the lower surface of the protection cover 22 and the lower surface of the color changeable decoration layer 24. The touch substrate 28 with a sensing electrode is located at the lower surface of the insulation layer 26. The insulation layer 26 can be the adhesive layer, for example the transparent optical adhesive of any kind, such that the touch substrate 28 and protection cover 22 can adhere to each other via the insulation layer 26.

It is noted that the color changeable decoration layer 24 can be made of thermochromic material or photochromic material, and the color thereof changes according to the temperature or light variation. The thermochromic material or photochromic material is divided into three categories, the organic, inorganic, and liquid crystal. The organic photochromic material comprises the color changeable composition added therein, such spiro indoline, spiro pyran, spiro oxazine. Under the action of light, the chemical reaction of the composition occurs, such that the optic absorption property thereof is changed, and the different color thereof is generated. The liquid crystal thermochromic material comprises liquid crystals packaged by the microscopic capsules. When the environmental temperature changes, the liquid crystal structure slightly changes, and thus the combination of light reflection and refraction is changed to generate the different color thereof.

Generally speaking, the thermochromic material can be for example the heat sensitive material, which can be designed to change its color between 0 through 50 centigrade. Along with the environmental temperature variation, the color of color changeable decoration layer 24 changes. In addition, the thermochromic material can change its color via receipt of the thermal energy emitted from the touch display device.

The photochromic material substantially is the metamerism material. The color changeable decoration layer 24 can be made of at least two different kinds of materials which have the same visual color but different spectrum reflection curves. Thus, under the different light source, the color changeable decoration layer 24 has different color visually to achieve the color changeable effect.

Furthermore, through designing the pattern or graph on the color changeable decoration layer 24 properly, the color changeable decoration layer 24 has different visual pattern effects due to the color differences in the environments with the different temperatures and lights. Therefore, the color changeable decoration layer 24 does not have the problem of the monotone and dull.

In the exemplary embodiment of the present disclosure, the color changeable decoration layer 24 can be further used in the anti-fake purpose. The specific region with the designed pattern or graph of the color changeable decoration layer 24 can be designed to show the specific color or pattern formed by different colors under the specific low temperature, specific high temperature, or light with specific wavelength (such as infrared ray or ultraviolet ray), so as to recognize whether the touch panel is fake.

It is noted that, during the manufacturing procedure of the touch panel, the color changeable decoration layer 24 is formed at the side region of the lower surface of the protection cover 22, so as to form a touch screen structure 21. The touch substrate 28 can be adhered to the touch screen structure 21 via the insulation layer 26 to form the touch panel 2.

Another Exemplary Embodiment of Touch Panel and Touch Screen Structure

Figure 1C:
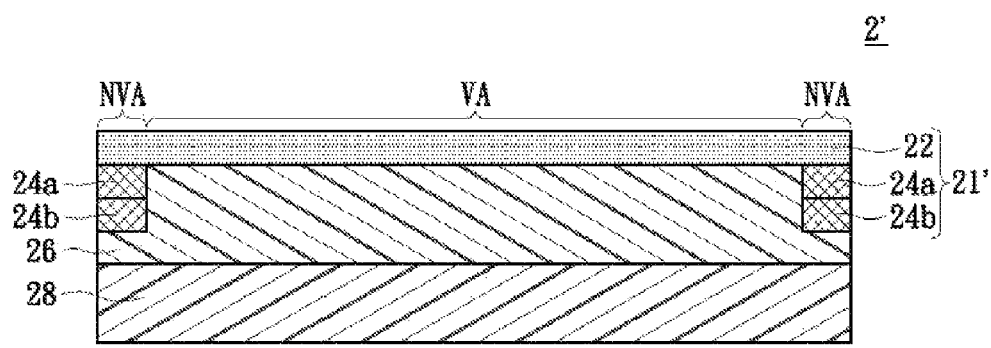
FIG. 1C through FIG. 1E are sectional views of touch panels according to other exemplary embodiments of the present disclosure.

Referring to FIG. 1C, FIG. 1C is a sectional view of touch panel according to an exemplary embodiment of the present disclosure. Compared to the touch panel 2 and the touch screen structure 21 in FIG. 1B, the touch panel 2' and the touch screen structure 21' in the exemplary embodiment have two color changeable decoration layers 24a and 24b.

The two color changeable decoration layers 24a and 24b are respectively made of the different kinds of materials which have the different colors after the materials change the color thereof. Furthermore, the hollow pattern can be designed in the color changeable decoration layer 24a, such that the color of the color changeable decoration layer 24b can be showed in the hollow pattern. Thus, the touch panel 2' can have the colorful pattern effect visually. It is noted that the layer number of the color changeable decoration layers 24a and 24b is not used to limit the present disclosure.

Another Exemplary Embodiment of Touch Panel and Touch Screen Structure

Figure 1D:
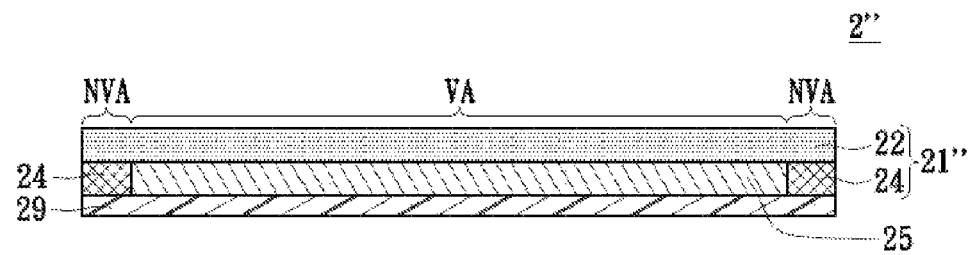

Referring to FIG. 1D, FIG. 1D is a sectional view of touch panel according to an exemplary embodiment of the present disclosure. Compared to the touch panel 2 in FIG. 1B that the protection cover 22 and the touch substrate 28 adhere to each other via the insulation layer 26, the touch panel 2" in the exemplary embodiment of the present disclosure is a single plate that the sensing electrode layer 29 is directly formed under the protection cover 22 and the color changeable decoration layer 24.

To put it concretely, the touch panel 2" further comprises a smoothing layer 25, wherein the smoothing layer 25 is located at the lower surface of the protection cover 22 and the visible region VA of the touch panel 2". The smoothing layer 25 is made of polymer, and used to smooth the height difference between the protection cover 22 and the color changeable decoration layer 24, such that the sensing electrode layer 29 can be formed at the lower surface of the smoothing layer 25.

According to another exemplary embodiment of the present disclosure, the smoothing layer 25 can be removed from the touch panel 2" to reduce the manufacturing procedure, and the sensing electrode layer 29 can be directly formed at the lower surface of the protection cover 22 and the lower surface of the color changeable decoration layer 24.

Another Exemplary Embodiment of Touch Panel and Touch Screen Structure

Figure 1E:
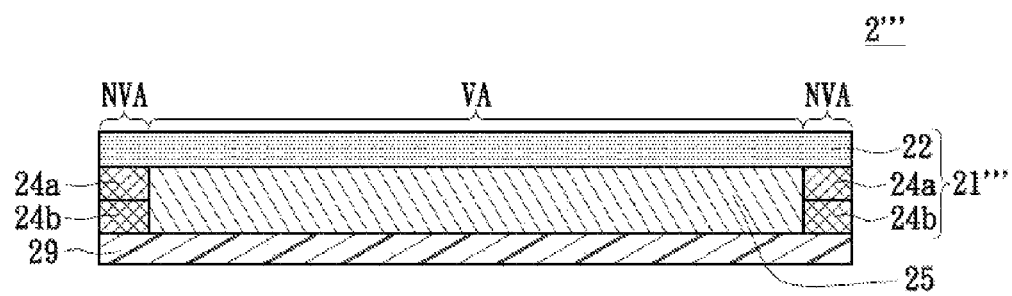

Referring to FIG. 1E, FIG. 1E is a sectional view of touch panel according to an exemplary embodiment of the present disclosure. Compared to the touch panel 2" and the touch screen structure 21" in FIG. 1D, the touch panel 2''' and the touch screen structure 21''' in the exemplary embodiment have two color changeable decoration layers 24a and 24b. It is noted that the number of layers of the color changeable decoration layers 24a and 24b is not used to limit the present disclosure. Furthermore, compared to the touch panels 2 and 2' respectively in FIG. 1B and FIG. 1C, since the sensing electrode layer 29 is directly formed under the protection layer 22, the touch panels 2" and 2''' in FIG. 1D and FIG. 1E have the less thickness.

Exemplary Embodiment of Touch Display

Figure 2:
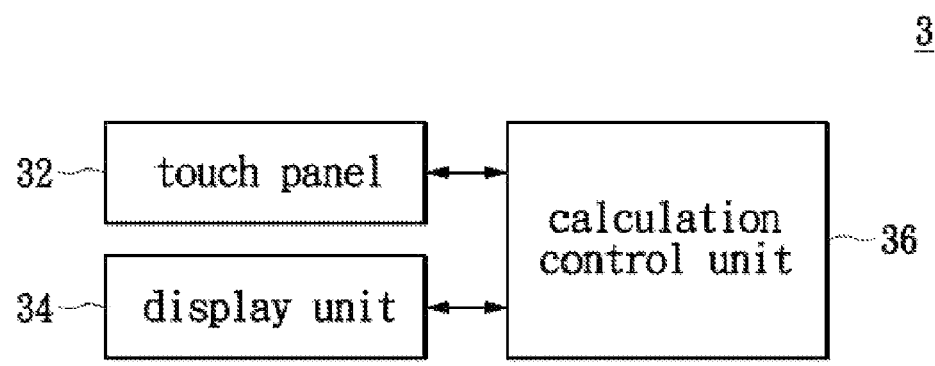
FIG. 2 is a block diagram of a touch display device according to an exemplary embodiment of the present disclosure.

Referring to FIG. 2, FIG. 2 is a block diagram of a touch display device according to an exemplary embodiment of the present disclosure. The touch display device 3 comprises a touch panel 32, a display unit 34, and a calculation unit 36. The touch panel 32 is located on the display unit 34, and the touch panel 32 and the display unit 34 are electrically connected to the calculation unit 36.

The touch panel 32 can be any one of the above mentioned touch panels. The display unit 34 has a display panel used to display the image on the visible region VA of the touch panel 32 according to the image data. In addition, the calculation unit 36 controls the display unit 34 to display the image according to the image data, and receives the sensing signal of the touch panel 32 to obtain the touch position. Even, the calculation unit 36 can execute the corresponding command from the touch panel 32 or control the display unit 34 to display the corresponding image according to the touch position.

Since the touch display device 3 uses one of the above mentioned touch panels, the touch display device 3 does not have the problem of monotone and dull visually. Furthermore, the touch display device 3 can have the anti-fake function.

Results of Exemplary Embodiments

Accordingly, the touch panel and the touch screen structure provided by the exemplary embodiments of the present disclosure have the color changeable decoration layer, and the color changeable decoration layer can change its color according to the temperature or light variation to provide a good visual effect. Furthermore, by designing the patterns or graphs on the color changeable decoration layer, the color changeable decoration layer can provide different patterns or design effects while its color is changed, such that the various and colorful visual appearances are provided. Moreover, the present disclosure can be used for the anti-fake policy.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A touch panel defined to have a visible region and a non-visible region, comprising:
    a protection cover located in the visible region and the non-visible region of the touch panel;
    at least one color changeable decoration layer, made of thermochromic material, located at a side region of a lower surface of the protection cover, wherein a region on which the color changeable decoration layer is located defines the non-visible region of the touch panel;
    an insulation layer, located at the lower surface of the protection cover and a lower surface of the color changeable decoration layer; and
    a touch substrate, located at a lower surface of the insulation layer, wherein the touch substrate and the protection cover are in direct contact with the insulation layer.

2. The touch panel according to claim 1, wherein the thermochromic material is heat sensitive material.

3. The touch panel according to claim 1, wherein the thermochromic material comprises liquid crystals packaged by microscopic capsules.

4. The touch panel according to claim 1, wherein the insulation layer is a transparent optical adhesive.

5. The touch panel according to claim 1, wherein the touch substrate comprises a sensing electrode.

6. A touch panel defined to have a visible region and a non-visible region, comprising:

a protection cover located in the visible region and the non-visible region of the touch panel;

at least one color changeable decoration layer, made of photochromic material, located at a side region of a lower surface of the protection cover, wherein a region on which the color changeable decoration layer is located defines the non-visible region of the touch panel;

an insulation layer, located at the lower surface of the protection cover and a lower surface of the color changeable decoration layer; and a touch substrate, located at a lower surface of the insulation layer, wherein the touch substrate and the protection cover are in direct contact with the insulation layer.

7. The touch panel according to claim 6, wherein the photochromic material is metamerism.

8. The touch panel according to claim 6, wherein the photochromic material comprises spiro indoline, spiro pyran, spiro oxazine, or combination thereof.

9. The touch panel according to claim 6, wherein the insulation layer is a transparent optical adhesive.

10. The touch panel according to claim 6, wherein the touch substrate comprises a sensing electrode.

11. A touch panel defined to have a visible region and a non-visible region, comprising:

a protection cover located in the visible region and the non-visible region of the touch panel;

at least one color changeable decoration layer, made of thermochromic material, located at a side region of a lower surface of the protection cover, wherein a region on which the color changeable decoration layer is located defines the non-visible region of the touch panel; and a touch sensing electrode layer, formed under the protection cover and the color changeable decoration layer.

12. The touch panel according to claim 11, wherein the thermochromic material is heat sensitive material.

13. The touch panel according to claim 11, wherein the thermochromic material comprises liquid crystals packaged by microscopic capsules.

14. The touch panel according to claim 11, wherein the touch sensing electrode layer is directly formed under the lower surface of the protection cover and a lower surface of the color changeable decoration layer.

15. The touch panel according to claim 11, further comprising a smoothing layer, wherein the smoothing layer is located at the lower surface of the protection cover and located at a visible region corresponding to the non-visible region of the touch panel, wherein the touch sensing electrode layer is formed at the lower surface of the smoothing layer.

16. The touch panel according to claim 15, wherein the smoothing layer is made of polymer.

17. A touch panel defined to have a visible region and a non-visible region, comprising:

a protection cover located in the visible region and the non-visible region of the touch panel;

at least one color changeable decoration layer, made of photochromic material, located at a side region of a lower surface of the protection cover, wherein a region on which the color changeable decoration layer is located defines the non-visible region of the touch panel; and a touch sensing electrode layer, formed under the protection cover and the color changeable decoration layer.

18. The touch panel according to claim 17, wherein the photochromic material is metamerism.

19. The touch panel according to claim 17, wherein the photochromic material comprises spiro indoline, spiro pyran, spiro oxazine, or combination thereof.

20. The touch panel according to claim 17, wherein the touch sensing electrode layer is directly formed under the lower surface of the protection cover and a lower surface of the color changeable decoration layer.

21. The touch panel according to claim 17, further comprising a smoothing layer, wherein the smoothing layer is located at the lower surface of the protection cover and located at a visible region corresponding to the non-visible region of the touch panel, wherein the touch sensing electrode layer is formed at a lower surface of the smoothing layer.

22. The touch panel according to claim 21, wherein the smoothing layer is made of polymer.

* * * * *